US011060910B2

United States Patent
Ave

(10) Patent No.: US 11,060,910 B2
(45) Date of Patent: Jul. 13, 2021

(54) XENON SUPPRESSION FILTER FOR SPECTROMETRY

(71) Applicant: Ocean Optics, Inc., Largo, FL (US)

(72) Inventor: Paul W. Ave, Orlando, FL (US)

(73) Assignee: Ocean Optics, Inc., Largo, FL (US)

( * ) Notice: Subject to any disclaimer, the term of this patent is extended or adjusted under 35 U.S.C. 154(b) by 18 days.

(21) Appl. No.: 16/027,449

(22) Filed: Jul. 5, 2018

(65) Prior Publication Data

US 2018/0321084 A1 Nov. 8, 2018

Related U.S. Application Data

(63) Continuation-in-part of application No. 15/244,434, filed on Aug. 23, 2016, now abandoned.

(60) Provisional application No. 62/217,078, filed on Sep. 11, 2015.

(51) Int. Cl.
  *G01J 3/02* (2006.01)
  *G01J 3/10* (2006.01)
  *G02B 5/20* (2006.01)
  *G01J 3/12* (2006.01)

(52) U.S. Cl.
  CPC ............... *G01J 3/0229* (2013.01); *G01J 3/10* (2013.01); *G02B 5/208* (2013.01); *G01J 2003/1213* (2013.01); *G01J 2003/1247* (2013.01)

(58) Field of Classification Search
  CPC .......... G02B 5/201; G02B 5/003; G02B 5/22; G02B 5/208; G02B 5/20; G01J 3/12; G01J 2003/1213; G01J 2003/2826; G01J 3/0205; G01J 3/0229; G01J 3/26
  USPC .................................. 359/890, 885, 891, 892
  See application file for complete search history.

(56) References Cited

U.S. PATENT DOCUMENTS

2005/0099678 A1* 5/2005 Wang ..................... G02B 5/208
  359/359

OTHER PUBLICATIONS

Ocean Optics 2007 Catalog, (http://www.oemoptic.ru/docs/cat/catalog.pdf), Nov. 2011, pp. 1-196 (Year: 2011).*

* cited by examiner

*Primary Examiner* — Jade R Chwasz
(74) *Attorney, Agent, or Firm* — Perkins Coie LLP

(57) ABSTRACT

A device for improving the suppression of light from a Pulsed Xenon light source for spectrometry by combining a Variable Longpass Order-Sorting filter with a Dichroic Balancing filter coated on a fused Silica substrate is disclosed.

18 Claims, 2 Drawing Sheets

Effects of Xenon Suppresion Filter

XENON SUPPRESSION FILTER FOR SPECTROMETRY

CROSS-REFERENCE TO RELATED APPLICATION

The present application claims the benefit of previously filed Provisional Patent Application, Ser. No. 62/217,078, filed on Sep. 11, 2015, and previously filed co-pending patent application Ser. No. 15/244,434, filed on Aug. 23, 2016.

FIELD OF THE INVENTION

The device of this disclosure belongs to the field of manufacture of spectrometer filters. More specifically it is a new Pulsed Xenon light source suppression filter for spectrometry applications.

BACKGROUND OF THE INVENTION

Pulsed Xenon or "PX" sources are a great source of light for variety of Spectroscopic applications such as Absorbance, Reflection, and Fluorescence measurements. They produce light energy with a spectral range from approximately 220-750 nm. However, they inherently produce more intense light output in the range from 400-600 nm. This can present itself as a problem when a user desires to take measurements outside of this range. This is because the spectrometer can become saturated with the stronger visible light before the maximum signal can be obtained in the Ultra-Violet and Near Infra-Red regions of the spectrum.

To compensate for the above described "unbalanced" spectral output the following Xenon suppression filter design for spectrometry applications is disclosed.

BRIEF SUMMARY OF THE INVENTION

This invention is a filter device for improving the suppression of light from a Pulsed Xenon light source for spectrometry by combining a Variable Longpass Order-Sorting filter with a Dichroic Balancing filter coated on a fused Silica substrate. The Dichroic Balancing filter is coated on the opposite side of the Variable Longpass Order-Sorting filter or combined with a second substrate. The substrate is made of fused silica to avoid any attenuation of signal in the UV regions. In one implementation, a Pulsed Xenon light source suppression filter used between a grating and a detector array in a spectrometer can be constructed to include a Dichroic Balancing filter configured to suppress the visible light spectrum band in the 400-600 nm range resulting in the leveling of the intensity of the light spectrum across all bands emitted by said Pulsed Xenon light source coated on one side of a fused Silica filter substrate; and a Variable Longpass Order-Sorting filter configured to remove second order stray light coated on the opposite side of said fused Silica filter substrate. In another implementation, a Pulsed Xenon light source suppression filter used between a grating and a detector array in a spectrometer can be constructed to include a Dichroic Balancing filter configured to suppress the visible light spectrum band in the 400-600 nm range resulting in the leveling of the intensity of the light spectrum across all bands emitted by said Pulsed Xenon light source coated on a first fused Silica filter substrate; a Variable Longpass Order-Sorting filter configured to remove second order stray light coated on a second fused Silica filter substrate; and the first and second coated fused Silica filter substrates are combined.

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENT

As discussed above the disclosed device improves the suppression of light from a Pulsed Xenon light source for spectrometry by combining a Variable Longpass Order-Sorting filter with a Dichroic Balancing filter by coating them both on a fused Silica substrate.

In Spectrometry an Order-Sorting Filter is specifically designed to be used between the grating and the detector array in a spectrometer to block second and/or higher diffracted orders of light from entering the detector array as is well known by those skilled in the art. More specifically in Applicant's preferred embodiment on one side of the substrate the Variable Longpass Order-Sorting Filter has a spectral range from 200-850 nm and begins to block second order light from 185 nm-450 nm (starting at the first order spectral location of 370 nm) from hitting the detector array.

Also, a Balancing filter is generally defined in photography as a "Filter used on light-source to produce small change in colour temperature to match or balance source to film being use" (See: http://www.idigitalphoto.com/dictionary/light_balancing_filter). Of course in Spectrometry the "film" would be the detector array. Thus in Applicant's preferred embodiment that Balancing filter is used to produce a change in the colour temperature of the uneven spectrum output from the Pulsed Xenon light source in order to better match the level spectrum response of a typical spectrometer detector array. This is done by suppressing visible light up to 80% from approximately 400-600 nm, the more intense Pulsed Xenon light source light output, as discussed in the third paragraph under the section entitled "Background of the Invention" in this patent document.

Figure 1:
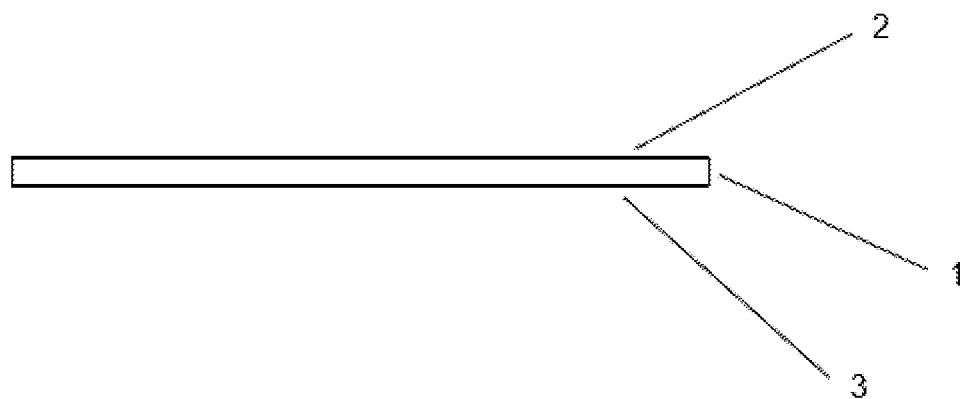
FIG. 1 shows a diagram of the Xenon Suppression Filter on one substrate.

As shown in FIG. 1 a preferred embodiment of this device is constructed by coating on a substrate (1) the Dichroic Balancing filter (3) (shown at bottom) and on the opposite side the Variable Longpass Order-Sorting filter (2) (shown at top), or, in an alternate embodiment, by combining the two filters (2 and 3) using two substrates (1). The substrates (1) are made of fused silica to avoid any attenuation of signal in the UV regions.

Figure 2:
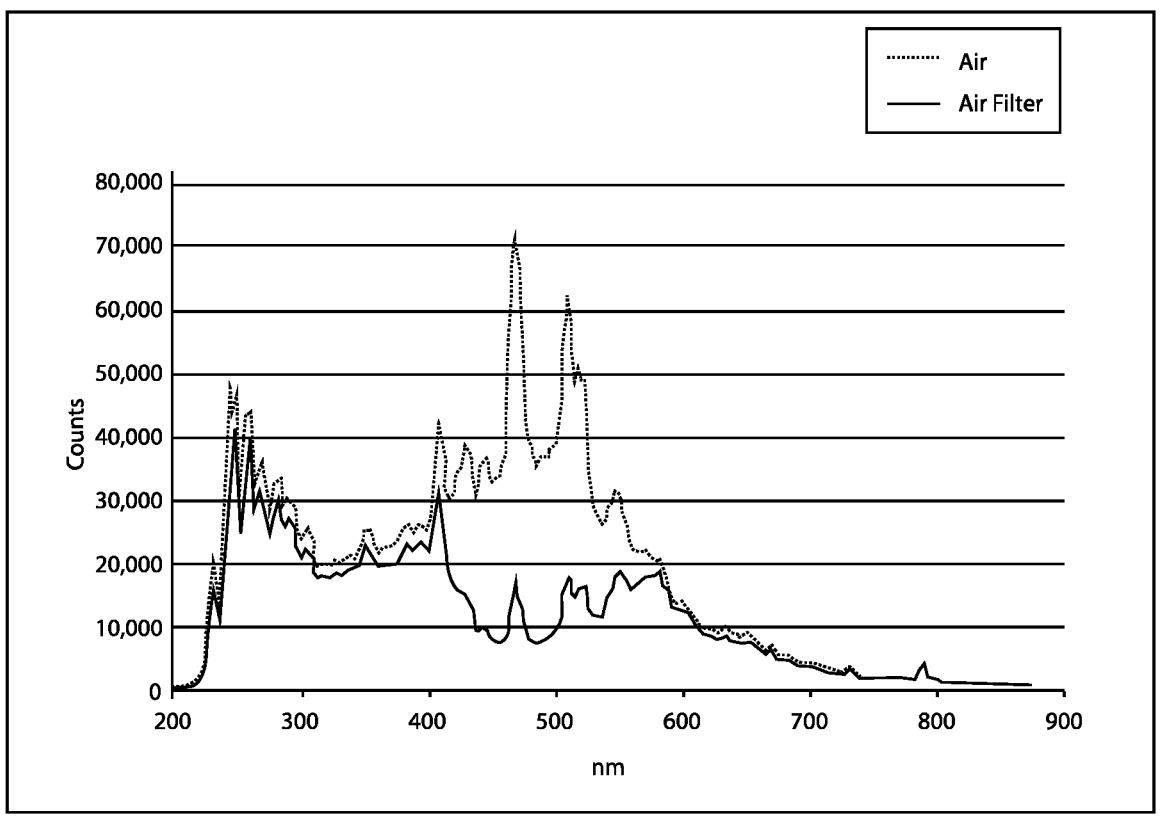
FIG. 2 shows a diagram of the spectral response of the Xenon Suppression Filter.

As shown in FIG. 2 the device of this disclosure suppresses the more intense light output in the range from 400-600 nm from the Pulsed Xenon light source. The Dichroic Balancing filter is structured so that the lowest intensity of the light in the visible light spectrum band in the 400-600 nm range is lower than the lowest intensity of the light in a light spectrum band in the 300-400 nm range.

Since certain changes may be made in the above described Xenon suppression filter without departing from the scope of the invention herein involved, it is intended that all matter contained in the description thereof or shown in the accompanying figures shall be interpreted as illustrative and not in a limiting sense.

What is claimed is:

1. A method for using a Pulsed Xenon light source suppression filter between a grating and a detector array in a spectrometer comprising:

providing in the Pulsed Xenon light source suppression filter a Dichroic Balancing filter configured to suppress a visible light spectrum band in the 400-600 nm range resulting in a leveling of the intensity of the light spectrum across all bands emitted by said Pulsed Xenon light source coated on one side of a fused Silica filter substrate such that, for light emitted by the Pulsed Xenon light source and transmitted through the Dichroic Balancing filter, the lowest intensity of the light in the visible light spectrum band in the 400-600 nm range is lower than the lowest intensity of the light in a light spectrum band in the 300-400 nm range;

providing in the Pulsed Xenon light source suppression filter a Variable Longpass Order-Sorting filter configured to remove second order stray light coated on the opposite side of said fused Silica filter substrate;

placing the Pulsed Xenon light source suppression filter between the grating and the detector array to receive light from the grating and transmit at least a portion of the light received from the grating to the detector array.

2. The method as in claim 1, wherein the Variable Longpass Order-Sorting filter begins to block second order stray light in a light spectrum band from 185 nm-450 nm range starting at the first order spectral location of 370 nm from hitting the detector array.

3. The method as in claim 1, wherein the Variable Longpass Order-Sorting filter has a spectral range between 200 nm and 850 nm.

4. The method as in claim 1, wherein the Dichroic Balancing filter suppresses the visible light spectrum band in the 400-600 nm range by 80% or less.

5. A method for using a Pulsed Xenon light source suppression filter used between a grating and a detector array in a spectrometer comprising:

providing in the Pulsed Xenon light source suppression filter a Dichroic Balancing filter configured to suppress a visible light spectrum band in the 400-600 nm range resulting in a leveling of the intensity of the light spectrum across all bands emitted by said Pulsed Xenon light source coated on a first fused Silica filter substrate;

providing in the Pulsed Xenon light source suppression filter a Variable Longpass Order-Sorting filter configured to remove second order stray light coated on a second fused Silica filter substrate;

combining said first and second coated fused Silica filter substrates; and placing the Pulsed Xenon light source suppression filter between the grating and the detector array to receive light from the grating and transmit at least a portion of the light received from the grating to the detector array, wherein the leveling of the intensity of the light spectrum across all bands emitted by said Pulsed Xenon light source is such that, for light emitted by the Pulsed Xenon light source and transmitted through the Dichroic Balancing filter, the lowest intensity of the light in the visible light spectrum band in the 400-600 nm range is lower than the lowest intensity of the light in a light spectrum band in the 300-400 nm range.

6. The method as in claim 5, wherein the Variable Longpass Order-Sorting filter begins to block second order stray light in a light spectrum band from 185 nm-450 nm range starting at the first order spectral location of 370 nm from hitting the detector array.

7. The method as in claim 5, wherein the Variable Longpass Order-Sorting filter has a spectral range between 200 nm and 850 nm.

8. The method as in claim 5, wherein the Dichroic Balancing filter suppresses the visible light spectrum band in the 400-600 nm range by 80% or less.

9. A spectrometer comprising:

a xenon light source to produce xenon light;

a grating to receive the xenon light and to diffract the received xenon light to produce diffracted light of different spectral components at different spatial directions;

an optical detector array including different optical detectors to detect light; and a xenon light source suppression filter disposed between the grating and the detector array to modify the diffracted light from the grating for detection by the optical detector array, wherein the xenon light source suppression filter is structured to include a dichroic balancing filter configured to suppress light in a light spectrum band from 400 nm-600 nm range coated on a first side of a fused silica filter substrate, and a variable longpass order-sorting filter configured to remove second order stray light coated on a second side of the fused silica filter substrate, wherein the first side is opposite to the second side, and wherein the dichroic balancing filter is structured such that, for light produced by the xenon light source and transmitted through the dichroic balancing filter, the lowest intensity of the light in the light spectrum band from the 400 nm-600 nm range is lower than the lowest intensity of the light in a light spectrum band from the 300 nm-400 nm range.

10. The spectrometer as in claim 9, wherein the variable longpass order-sorting filter begins to block second order stray light in a light spectrum band from 185 nm-450 nm range starting at the first order spectral location of 370 nm from hitting the detector array.

11. The spectrometer as in claim 9, wherein the variable longpass order-sorting filter has a spectral range between 200 nm and 850 nm.

12. The spectrometer as in claim 9, wherein the dichroic balancing filter suppresses the light spectrum band from 400 nm-600 nm range by 80% or less.

13. The spectrometer as in claim 9, wherein the xenon light source suppression filter is structured to produce a change in the color temperature of the xenon light output from the xenon light source to better match a detector response of the detector array.

14. A spectrometer comprising:

a xenon light source;

a grating;

a detector array; and a xenon light source suppression filter disposed between the grating and the detector array and structured to include a dichroic balancing filter configured to suppress light in a light spectrum band from 400 nm-600 nm range coated on a first fused silica filter substrate, and a variable longpass order-sorting filter configured to remove second order stray light coated on a second fused silica filter substrate, wherein the first coated fused silica filter substrate is combined with the second fused silica filter substrate, and wherein the dichroic balancing filter is such that, for light produced by the xenon light source and transmitted through the dichroic balancing filter, the lowest intensity of the light in the light spectrum band from the 400 nm -600 nm range is lower than the lowest intensity of the light in a light spectrum band from the 300 nm-400 nm range.

15. The spectrometer as in claim 14, wherein the variable longpass order-sorting filter begins to block second order stray light in a light spectrum band from 185 nm-450 nm range starting at the first order spectral location of 370 nm from hitting the detector array.

16. The spectrometer as in claim 14, wherein the variable longpass order-sorting filter has a spectral range between 200 nm and 850 nm.

17. The spectrometer as in claim 14, wherein the dichroic balancing filter suppresses the light spectrum band from 400 nm-600 nm range by 80% or less.

18. The spectrometer as in claim 14, wherein the xenon light source suppression filter is structured to produce a change in the color temperature of the xenon light output from the xenon light source to better match a detector response of the detector array.

* * * * *